(12) United States Patent
Tinti et al.

(10) Patent No.: US 6,304,392 B1
(45) Date of Patent: Oct. 16, 2001

(54) THERMAL SHIMMING OF COMPOSITE STRUCTURAL MEMBERS

(75) Inventors: Robert Tinti, Torrance; Caesar C. Florentino, Palos Verdes; Doug M. Bell, Fountain Valley; Waleed F. Rahhal, Redondo Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/550,040

(22) Filed: Apr. 14, 2000

(51) Int. Cl.[7] .................................. G02B 7/02; H01S 3/04
(52) U.S. Cl. ................................................. 359/820; 372/34
(58) Field of Search ........................... 359/820, 811, 359/819; 372/65, 34

(56) References Cited

U.S. PATENT DOCUMENTS

| | | | |
|---|---|---|---|
| 4,613,972 | * | 9/1986 | Bettman .............................. 372/107 |
| 4,696,010 | * | 9/1987 | Eastman ................................ 372/34 |
| 4,989,217 | * | 1/1991 | Ostler ................................. 372/107 |
| 5,031,189 | * | 7/1991 | Stuhler et al. ......................... 372/92 |
| 5,309,282 | * | 5/1994 | Feldman et al. ...................... 359/641 |

* cited by examiner

Primary Examiner—Georgia Epps
Assistant Examiner—Saeed Seyrafi
(74) Attorney, Agent, or Firm—Harness, Dickey & Pierce

(57) ABSTRACT

A technique for controlling the coefficient of thermal expansion of composite structural members (16, 18, 20, 22) in an optical assembly (10) to maintain precise alignment between optical components (26, 28). The technique includes measuring the coefficient of thermal expansion of each composite structural member (16, 18, 20, 22) and identifying a target structural member having the highest coefficient of thermal expansion. A small end portion of the non-target structural members (16, 18, 20, 22) is removed and replaced with a spacer member (38). The spacer member (38) is made of a material so that the combination of the coefficient of thermal expansion of the spacer member (38) and the structural member (16, 18, 20, 22) matches the target coefficient of thermal expansion. Additionally, the thickness of the spacer member (38) is selected so that the overall length of each of the structural members is the same.

17 Claims, 2 Drawing Sheets

THERMAL SHIMMING OF COMPOSITE STRUCTURAL MEMBERS

GOVERNMENT CLAUSE

This invention was made with Government support under F29601-97-C-0001 awarded by the United States Air Force. The Government has certain rights in this invention.

BACKGROUND OF THE INVENTION

1. Field of the Invention

This invention relates generally to a method of matching the coefficient of thermal expansion of a plurality of structural members in an optical assembly and, more particularly, to a method of providing a thin spacer element at the end of one or more composite structural members associated with a laser optical assembly, where the combination of the coefficient of thermal expansion of the spacer element and the coefficient of thermal expansion of the structural member matches the coefficient of thermal expansion of a target structural member.

2. Discussion of the Related Art

Laser systems include structural elements that hold and mount optical components, such as mirrors, lenses, etc., in precise alignment with each other for proper laser operation. For example, certain laser systems include a resonant optical cavity where opposing mirrors are mounted to end plates of the cavity in very precise alignment with each other to maintain the lasing process. The laser system may be subjected to various disturbances, such as g-loads, shock, vibration and acoustical loads. These disturbances may act to misalign the optical components, thus degrading the operation of the laser system. Thus, the structural elements need to be rigid enough to prevent misalignment of the optical components under these disturbances.

In addition to the various disturbances mentioned above, environmental heat or heat caused by the operating temperature of the laser system can also cause misalignment of the optical components. Thermally induced misalignment is caused by certain structural support members associated with the laser system expanding at different rates in response to the heat. This thermal induced misalignment can be the result of the structural members having different lengths, the structural members having the same length but different coefficients of thermal expansion (CTE), or a combination of both. In one laser system, the end plates of the resonant cavity are connected together by four separate structural support members. If the CTE of the structural members are not matched, the heat may cause one member to expand in length more than the others. This length mismatch induces a tilt on the mirrors, which can cause optical misalignment, thus degrading the laser performance.

For those laser systems that need to be light-weight, for example, laser systems used in missile guidance systems on aircraft, the structural members are typically made of composite materials, such as carbon and graphite, to meet the weight requirements. The composite structural members must meet stringent coefficient of thermal expansion requirements for proper laser operation. The CTE of a composite structural member is controlled by material selection (fiber/resin system) and ply orientation. Presently, these types of composite structural members are made by wrapping a ply layer made of the composite material around a suitable substrate. The orientation of the fibers in the ply layer determine the CTE of the resulting member, and thus the ply layer must be accurately wound to meet the CTE tolerances of the laser system. The present manufacturing processes of these types of composite structural members for optical assemblies can not ensure proper orientation of the material to the degree required to meet CTE requirements, which are dictated by optical alignment requirements. Therefore, those structural members that do not meet the proper CTE requirements are discarded, thus incurring waste.

What is needed is a technique for controlling the CTE of composite structural members used to support optical components in a laser system. It is therefore an object of the present invention to provide such a technique.

SUMMARY OF THE INVENTION

In accordance with the teachings of the present invention, a technique for controlling the coefficient of thermal expansion (CTE) of composite structural members in an optical assembly is disclosed, that maintains precise alignment between optical components. This technique includes removing a narrow end portion of the structural member and replacing the removed portion with a metal shim member. The metal shim member is made of a material having a CTE that compensates for the overall CTE mismatch between the composite structural members.

In one embodiment, the apparent CTE of the several composite structural members used in a particular optical assembly can be made identical or nearly identical by the following procedure. First, each of the structural members are cut to the same length and the CTE of each structural member is measured. The structural member with the highest CTE is selected as the "target" member having the 'target' CTE. Then, the other structural members are modified, if necessary, by replacing an end portion of each member with a metal spacer having the appropriate thickness. The material and thickness of the spacer is selected so that the CTE of the combination of the spacer and the structural member matches the "target" CTE, and the original length of the structural member is retained.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a technique for controlling the coefficient of thermal expansion of the structural members in an optical assembly is merely exemplary in nature, and is in no way intended to limit the invention or its applications or uses.

Figure 1:
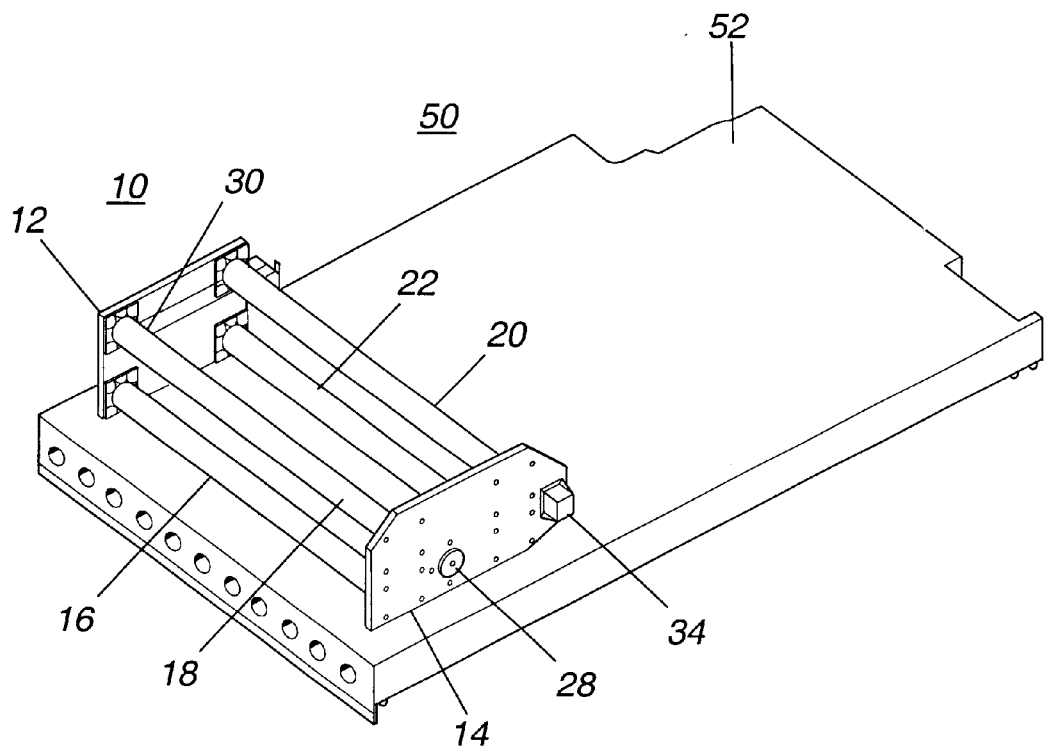
FIG. 1 is a perspective view of a metering structure of a laser system positioned on an optical bench.
Figure 2:
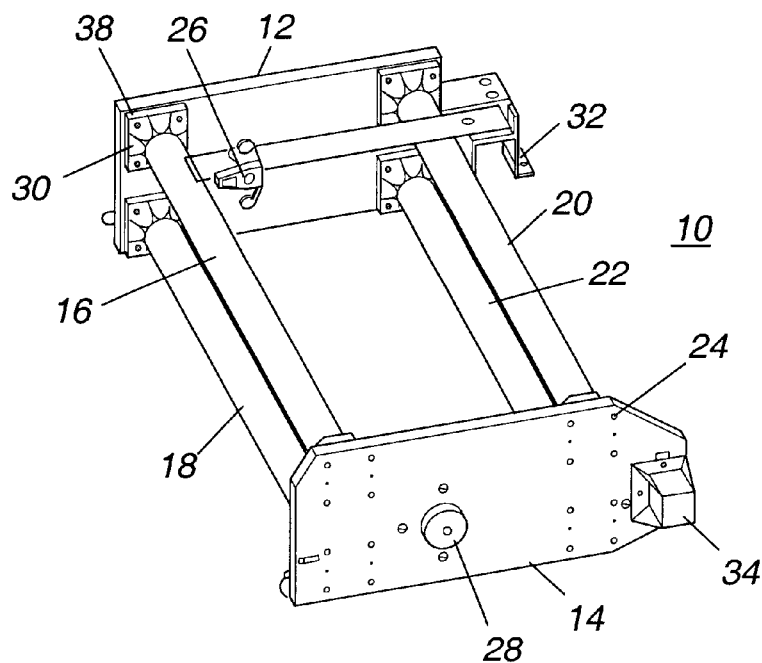
FIG. 2 is a perspective view of the metering structure separated from the optical bench that includes composite structural members and associated spacer elements, according to an embodiment of the present invention.
Figure 3:
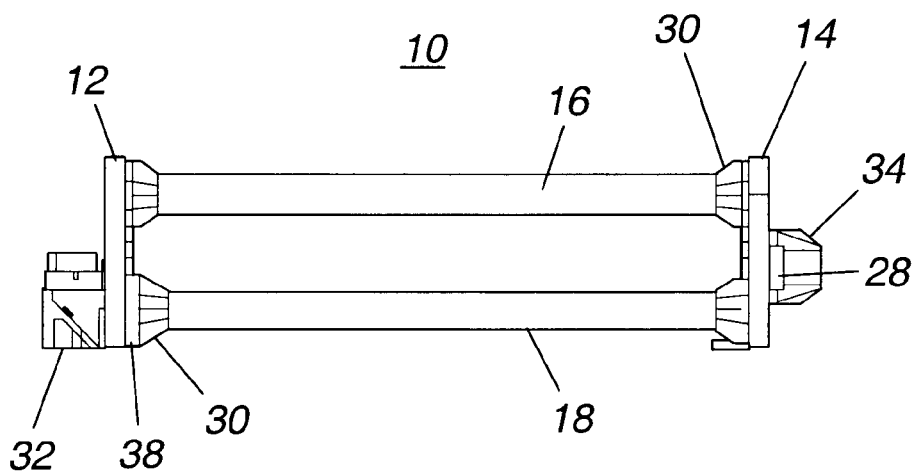
FIG. 3 is a side view of the metering structure shown in FIG. 2.
Figure 4:
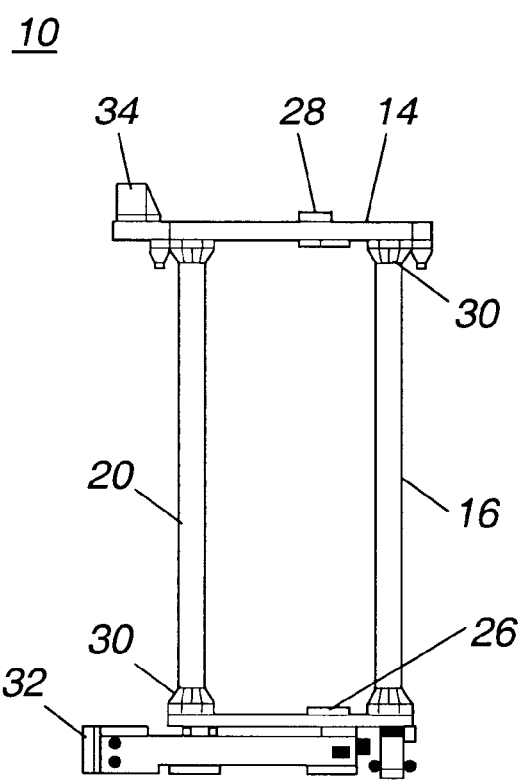
FIG. 4 is another side view of the metering structure shown in FIG. 2.

FIG. 1 is a perspective view of a portion of a laser system 50 mounted on an optical bench 52. A metering structure 10 is mounted to the optical bench 52, and includes optical components that define a resonant cavity of the laser system 50. FIG. 2 shows a perspective view and FIGS. 3 and 4 show side views of the metering structure 10 removed from the bench 52. The laser system 50 can be any laser system of the type described herein, such as laser systems mounted on aircraft for target acquisition and tracking purposes and laser systems used for industrial machining operations. The specifics of the laser operation are well known to those skilled in the art, and a discussion of this operation is not necessary for an understanding of the present invention.

The metering structure 10 includes opposing end plates 12 and 14 and composite structural support rods 16, 18, 20 and 22. The rods 16–22 are attached at four corners of the end plates 12 and 14 and provide structural support and separation. Each rod 16–22 includes an end fitting 30 secured to both ends of the rod 16–22 by a suitable adhesive, or the like. Each of the rods 16–22 is secured at each end to the end plates 12 and 14 by bolts 24. The bolts 24 extend through an outside surface of the end plates 12 and 14 and through the end fittings 30 to secure the rods 16–22 to the metering structure 10. In one embodiment, the mounting plates 30 are metal members, such as titanium. The support rods 16–22 are made of a known composite material, such as a woven carbon-graphite fiber. Such rods are well known in the art for this purpose.

A resonator outcoupler mirror 26 is mounted to the end plate 12 between the rods 16–22, and a resonator reflector mirror 28 is mounted to the end plate 14 between the rods 16–22, as shown. The mirrors 26 and 28 are mounted on the end plates 12 and 14 so that they are aligned with each other to provide light amplification. Other optical components, such as directing mirror 34, is mounted to the end plate 14, and also make up the optical assembly associated with the laser system 50. Other optical components are not shown for clarity purposes, and are not necessary for a description of the invention.

A laser beam is generated within the metering structure 10 and is reflected back and forth between the mirrors 26 and 28, with a portion leaking through the output coupler on each oscillation for laser output. The reflected portion returns to the gain media to stimulate the extraction of stored energy, and the process is repeated until all stored energy in the gain medium is depleted. The operation of the metering structure 10, and its associated optical components are well understood to those skilled in the art.

As discussed above, thermal loads are induced on the metering structure 10 from environmental heat sources or operation of the laser system that cause the composite structural rods 16–22 to expand. Because of the limitations on the manufacturing processes of the structural rods 16–22, the CTE of the rods 16–22 can not be precisely matched, where each rod 16–22 will expand about the same amount for the same amount of heat. When the rods 16–22 expand differently, the end plates 12 and 14 tilt relative to each other under the thermal load. If this tilting is significant enough, the mirrors 26 and 28 will go out of optical alignment, as well as other optical components associated with the structure 10, causing the lasing operation to cease or laser performance to be degraded.

According to an embodiment of the present invention, one or more of the composite rods 16–22 is equipped with a shim or spacer member 38. The spacer member 38 can be made of any suitable rigid material, such as aluminum, that has a consistent and well defined CTE. In this example, the member 38 is positioned between one of the mounting plates 30 of the rod 18 and the end plate 12. Only one end of the rod 18 includes the spacer member 38. However, any or all of the ends of the other rods 16, 20 and 22 can be provided with a spacer member of the same or different thicknesses consistent with the discussion herein.

The metering structure 10 must be able to provide proper laser alignment through a range of temperatures, particularly from a start-up temperature through laser operating temperatures. In general, the technique of the invention includes matching the CTE of the structural rods 16–22 very precisely by measuring the CTE of each individual rod 16–22 after it has been cut to an original length. Then, each rod that is not within a desirable CTE range is cut and a spacer member 38 is inserted at an end of the rod 16–22, so that the combination of the spacer member 38 and the rod 16–22 does fall within the CTE range, and has a length that is the same as the original length of the rod. In other words, if the measured CTE of one of the rods 16–22 does not fall within a predetermined range, a portion of that rod is removed and replaced with a shim having a different CTE so that the combined CTE of the rod and the shim does fall within the predetermined range.

In one embodiment, the rods 16–22 are cut to an original length, and are measured to separately determine their coefficient of thermal expansion. After the CTE of each of the structural rods 16–20 is measured, the rod 16–22 with the highest CTE becomes the rod having the target CTE. This rod is mounted to the end plates 12 and 14 without a spacer member. Depending on the measured value of the CTE of the other rods, a certain amount of the length of the rod 16–22 is removed, if the CTE of that rod is not within the desired CTE range. After the CTE of each rod 16–22 is measured and an end portion of the rod is removed, the rod is then glued to the end fittings 30. Thus, in most cases, the target rod will be the longest, and the other three rods 16–22 will be shorter depending on their measured CTE. The amount of the rod 16–22 that is removed determines the resulting thickness of the spacer member 38 based on the target CTE, so that the CTE of the combination of the spacer member 38 and the rod matches the target CTE. Also, the length of the combination of the member 38 and the rod 16–22 has the original length of the rod. In this way, the apparent coefficient of thermal expansion of all of the structural rods 16–22 can be made identical or nearly identical.

In this embodiment, the spacer member 38 is under the clamping load of the bolts 24. As the bolts 24 are threaded through the spacer member 38 and into the mounting plate 30, the torque induced on the spacer member 38 will influence the CTE of the spacer member 38. The torque on the member 38 must be considered to determine the apparent CTE of the structural rods 16–22. The torque on the target structural rod 16–22 also effects the CTE of that rod, and must also be considered in the CTE calculations. Therefore, the structural systems target CTE may also be tailored by selecting certain fastener parameters, such as the number of fasteners, the material of the fastener and the torque value of the fastener on the spacer member 38.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. An optical assembly comprising:
    a first end plate including a first optical component;
    a second end plate including a second optical component, said first and second optical components being aligned;
    a plurality of structural members each having a coefficient of thermal expansion, each structural member having a first end connected to the first end plate and a second end connected to the second end plate, and
    at least one spacer member being positioned between one end of a first one of the structural members and one of the end plates, said spacer member having a coefficient of thermal expansion that is different than the coefficient of thermal expansion of the first structural member so that the combination of the spacer member and the first structural member has an apparent coefficient of thermal expansion that matches the coefficient of thermal expansion of a second structural member.

2. The assembly according to claim 1 wherein the second structural member has a target coefficient of thermal expansion and each of the other structural members includes a spacer member, each spacer member having a coefficient of thermal expansion and a thickness where the combination of the coefficient of thermal expansion of the spacer member and each other structural member matches the target coefficient of thermal expansion.

3. The assembly according to claim 2 wherein the length of the combination of each other structural member and spacer member is the same as the length of the second structural member.

4. The assembly according to claim 2 wherein the plurality of structural members is four structural members connected to corner portions of the first and second end plates, where one of the structural members has the target coefficient of thermal expansion and the other structural members include separate spacer members.

5. The assembly according to claim 1 wherein the first structural member is secured to the end plates by at least one threaded fastener such that the threaded fastener induces a torque on the spacer member that affects its coefficient of thermal expansion.

6. The assembly according to claim 5 wherein at least one threaded fastener is a plurality of bolts threaded from a side of the end plate opposite to the structural member.

7. The assembly according to claim 1 wherein the assembly is a metering structure associated with a laser system.

8. The assembly according to claim 7 wherein the first and second optical components are resonator mirrors associated with a resonator cavity and the metering structure maintains alignment between the resonator mirrors.

9. The assembly according to claim 7 wherein the structural members are made of a composite material.

10. An optical assembly for use in connection with a laser system, said optical assembly comprising:
    a first end plate including a first resonator mirror;
    a second end plate including a second resonator mirror, said first and second resonator mirrors being aligned;
    first, second, third and fourth composite structural members each having a coefficient of thermal expansion, each structural member including a first end connected to the first end plate and a second end connected to the second end plate, said first structural member being directly connected to the first and second end plates and having a target coefficient of thermal expansion; and
    a first spacer member positioned between one end of the second structural member and one of the end plates where the combination of the spacer member and the second structural member has a length about the same as the first structural member and the combination of the coefficient of thermal expansion of the spacer member and the coefficient of thermal expansion of the second structural member is about the same as the target coefficient of thermal expansion.

11. The assembly according to claim 10 wherein the third structural member includes a second spacer member positioned between the first end of the third structural member and the first end plate and the fourth structural member includes a third spacer member positioned between the first end of the fourth structural member and the first end plate, and wherein the overall length of the second spacer member and the third structural member and the third spacer element and the fourth structural member is about the same as the length of the first structural member, and the combination of the coefficient of thermal expansion of the second spacer member and the coefficient of thermal expansion of the third structural member and the combination of the coefficient of thermal expansion of the third spacer member and the coefficient of thermal expansion of the fourth structural member is about the same as the target coefficient of thermal expansion.

12. The assembly according to claim 10 wherein the second structural member is secured to the end plate by a plurality of bolts, where the bolts extend through the end plate and the spacer member and induces a torque on the spacer member that affects the coefficient of thermal expansion of the spacer member.

13. The assembly according to claim 10 wherein the assembly is a metering structure.

14. A method of matching the apparent coefficient of thermal expansion of a plurality of structural members associated with an optical assembly, said method comprising the steps of:
    measuring the coefficient of thermal expansion of each of the structural members;
    identifying the structural member with the highest coefficient of thermal expansion as a target structural member having a target coefficient of thermal expansion;
    removing an end portion of one or more of the other structural members; and
    replacing the removed end portion with a spacer member having a different coefficient of thermal expansion than the structural member so that the combination of the coefficient of thermal expansion of the spacer member and the coefficient of thermal expansion of its structural member matches the target coefficient of thermal expansion.

15. The method according to claim 14 further comprising the step of cutting the plurality of structural members to the same length prior to the step of measuring the coefficient of thermal expansion of each structural member.

16. The method according to claim 15 wherein the step of replacing the removed end portion with a spacer member includes replacing the removed portion with a spacer member that has a thickness that makes the entire length of the structural member the same as its length prior to removing the end portion.

17. The method according to claim 14 further comprising the step of fastening the structural members to an end plate by a threaded member that imparts a torque on the spacer member, where the torque is used to control the coefficient of thermal expansion of the spacer member.

* * * * *